United States Patent
Lee et al.

(10) Patent No.: US 10,372,662 B2
(45) Date of Patent: Aug. 6, 2019

(54) UNIVERSAL SERIAL BUS COMMUNICATIONS SYSTEM

(71) Applicant: Samsung Electronics Co., Ltd., Suwon-si (KR)

(72) Inventors: Cheon-Su Lee, Hwaseong-si (KR); Rohitaswa Bhattacharya, Suwon-si (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 142 days.

(21) Appl. No.: 15/463,009

(22) Filed: Mar. 20, 2017

(65) Prior Publication Data

US 2018/0052800 A1    Feb. 22, 2018

(30) Foreign Application Priority Data

Aug. 17, 2016 (KR) .................. 10-2016-0104071

(51) Int. Cl.
| | |
|---|---|
| G06F 13/38 | (2006.01) |
| G06F 13/42 | (2006.01) |
| G06F 13/36 | (2006.01) |
| G06F 13/40 | (2006.01) |

(52) U.S. Cl.
CPC ......... G06F 13/4282 (2013.01); G06F 13/36 (2013.01); G06F 13/4068 (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,667,993 B1* | 12/2003 | Lippett | ............ H04L 25/03866 370/509 |
| 7,231,473 B2 | 6/2007 | Yen | |
| 7,831,758 B2 | 11/2010 | Rothman et al. | |
| 8,000,350 B2 | 8/2011 | Riedel et al. | |
| 8,341,303 B2 | 12/2012 | Solomon et al. | |
| 9,237,304 B2 | 1/2016 | Yang et al. | |
| 9,959,239 B2* | 5/2018 | Voor | .................. G06F 13/4282 |
| 2014/0325250 A1 | 10/2014 | Foster et al. | |
| 2015/0074312 A1 | 3/2015 | Barus et al. | |

FOREIGN PATENT DOCUMENTS

| | | |
|---|---|---|
| JP | 2012-073686 A | 4/2012 |
| JP | 2012-098885 A | 5/2012 |
| KR | 0432663 B | 3/2004 |

* cited by examiner

*Primary Examiner* — Cheng Yuan Tseng
(74) *Attorney, Agent, or Firm* — Muir Patent Law, PLLC

(57) ABSTRACT

A universal serial bus (USB) communication system includes a USB host that divides one data stream into first through (n)th sub-data streams and transmits the first through (n)th sub-data streams via first through (n)th USB host channels, respectively, a USB device that receives the first through (n)th sub-data streams via first through (n)th USB device channels, respectively and restores the data stream by combining the first through (n)th sub-data streams, and first through (n)th cables that are connected to the first through (n)th USB host channels via first through (n)th USB host ports and connected to the first through (n)th USB device channels via first through (n)th USB device ports. Here, the first through (n)th cables connect the first through (n)th USB host channels to the first through (n)th USB device channels, respectively.

17 Claims, 8 Drawing Sheets

UNIVERSAL SERIAL BUS COMMUNICATIONS SYSTEM

CROSS-REFERENCE TO RELATED APPLICATION(S)

This application claims the benefit of priority under 35 U.S.C. § 119 to Korean Patent Application No. 10-2016-0104071, filed on Aug. 17, 2016, in the Korean Intellectual Property Office (KIPO), the contents of which are incorporated herein in its entirety by reference.

BACKGROUND

1. Technical Field

Example embodiments relate generally to a universal serial bus (USB) communication. More particularly, the disclosed embodiments relate to a USB communication system including a USB host and a USB device that perform a USB communication.

2. Description of the Related Art

A universal serial bus (USB) is a plug-and-play interface that connects computer peripheral devices such as a joystick, a keyboard, a telephone, a scanner, a printer, etc with a computer. Generally, the USB has been widely used as a port standard of the computer peripheral devices because a data transmission speed of the USB is fast and the USB can connect the computer peripheral devices in a chain form. However, a USB standard does not support a multi-channel technology in which a USB host transmits one data stream to a USB device via a plurality of USB channels. Thus, in the USB standard, one data stream is not divided to be transmitted via a plurality of USB channels when a USB communication is performed between the USB host and the USB device via the USB channels. That is, in the USB standard, each data stream is transmitted via a respective one of the USB channels when the USB communication is performed between the USB host and the USB device via the USB channels. As a result, a conventional USB communication system has limits to increase a bandwidth for one data stream even when performing the USB communication using a plurality of USB channels.

SUMMARY

In some embodiments, the disclosure is directed to a universal serial bus (USB) communication system, comprising: a USB host configured to divide a data stream into first through (n)th sub-data streams, where n is an integer greater than or equal to 2, and to transmit the first through (n)th sub-data streams via first through (n)th USB host channels, respectively; a USB device configured to receive the first through (n)th sub-data streams via first through (n)th USB device channels, respectively, and to restore the data stream by combining the first through (n)th sub-data streams; and first through (n)th cables connected to the first through (n)th USB host channels via first through (n)th USB host ports, respectively, connected to the first through (n)th USB device channels via first through (n)th USB device ports, respectively, and configured to connect the first through (n)th USB host channels to the first through (n)th USB device channels, respectively.

In some embodiments, the disclosure is directed to a universal serial bus (USB) communication system, comprising: a USB host configured to divide a data stream into first through (n)th sub-data streams, where n is an integer greater than or equal to 2, and to transmit the first through (n)th sub-data streams via first through (n)th USB host channels, respectively; a USB device configured to receive the first through (n)th sub-data streams via first through (n)th USB device channels, respectively, and to restore the data stream by combining the first through (n)th sub-data streams; and a single cable connected to the first through (n)th USB host channels via a single USB host port and connected to the first through (n)th USB device channels via a single USB device port, and configured to connect the first through (n)th USB host channels to the first through (n)th USB device channels, respectively.

In some embodiments, the disclosure is directed to a universal serial bus (USB) communication system, comprising: a USB host configured to divide a data stream into first through (n)th sub-data streams, where n is an integer greater than or equal to 2, and to transmit the first through (n)th sub-data streams via first through (n)th USB host channels, respectively; a USB device configured to receive the first through (n)th sub-data streams via first through (n)th USB device channels, respectively, and to restore the data stream by combining the first through (n)th sub-data streams; and a cable connected to the first through (n)th USB host channels and connected to the first through (n)th USB device channels, and configured to connect the first through (n)th USB host channels to the first through (n)th USB device channels, respectively.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Hereinafter, embodiments of the present concept will be explained in detail with reference to the accompanying drawings.

It will be understood that when an element is referred to as being "connected" or "coupled" to, or "on" another element, it can be directly connected or coupled to, or on the other element or intervening elements may be present. In contrast, when an element is referred to as being "directly connected," "directly coupled," in or "directly on" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to a connection contact (i.e., touching) unless the context indicates otherwise.

As used herein, items described as being "electrically connected" are configured such that an electrical signal can be passed from one item to the other. Moreover, items that are "directly electrically connected," to each other are electrically connected through one or more passive elements, such as, for example, wires, pads, internal electrical lines, through vias, etc. As such, directly electrically connected components do not include components electrically connected through active elements, such as transistors or diodes.

Figure 1:
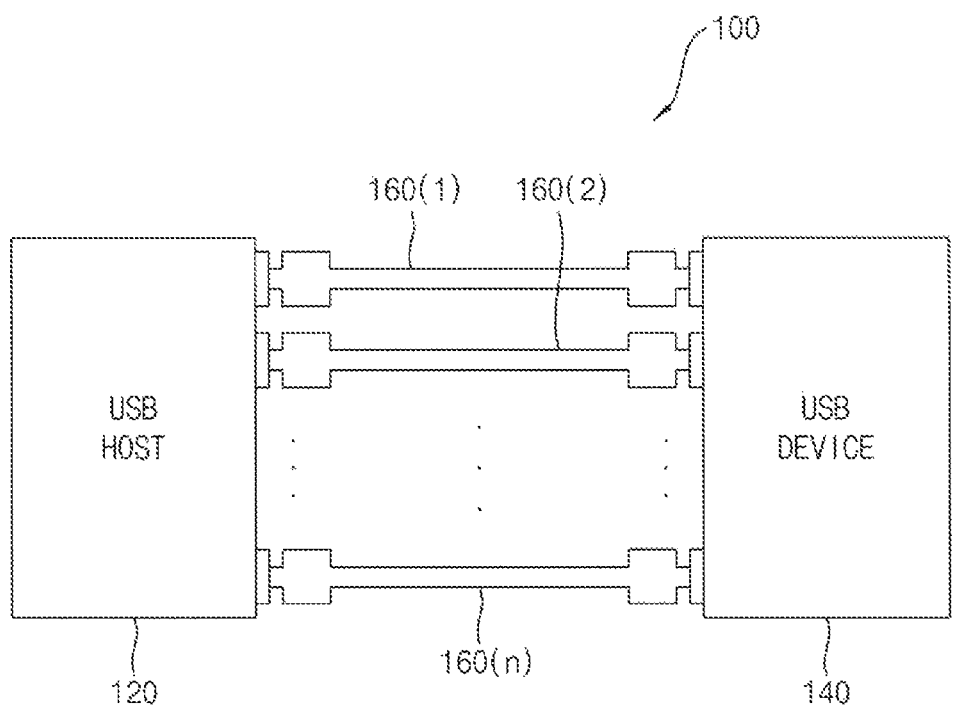
FIG. 1 is a diagram illustrating a USB communication system according to example embodiments.

FIG. 1 is a diagram illustrating a USB communication system according to example embodiments.

Referring to FIG. 1, the USB communication system 100 may include a USB host 120, a USB device 140, and first through (n)th cables 160(1) through 160(n), where n is an integer greater than or equal to 2. Here, the USB host 120 may transmit one data stream to the USB device 140 via first through (n)th USB channels. Here, a (k)th USB channel of the first through (n)th USB channels indicates a channel including a (k)th USB host channel of first through (n)th USB host channels in the USB host 120 and a (k)th USB device channel of first through (n)th USB device channels in the USB device 140, where k is an integer between 1 and n.

For example, the USB host 120 may divide one data stream into first through (n)th sub-data streams and then may transmit the first through (n)th sub-data streams to the USB device 140 via the first through (n)th USB host channels, respectively, where the first through (n)th USB host channels of the USB host 120 are connected to the first through (n)th USB device channels of the USB device 140 via the first through (n)th cables 160(1) through 160(n), respectively. For this operation, in an example embodiment, the USB host 120 may include the first through (n)th USB host channels, first through (n)th host first-in first-out (FIFO) devices, a host counter, and a multiplexer. The first through (n)th host FIFO devices may be connected to the first through (n)th USB host channels, respectively. Thus, the first through (n)th host FIFO devices may output the first through (n)th sub-data streams to the first through (n)th USB host channels, respectively. The host counter may count one data stream, which is defined by a predetermined splitting unit, to output a first count signal while the data stream is input. The multiplexer may alternately select the first through (n)th host FIFO devices based on the first count signal to generate the first through (n)th sub-data streams. For example, the first through (n)th sub-data streams may be generated by splitting one data stream by the predetermined splitting unit and by alternately storing the split data-pieces of the data stream in the first through (n)th host FIFO devices. The predetermined splitting unit may be a set length (or size) to which a data stream is to be split, and the sub-data streams may be data-pieces that have been split according to the predetermined splitting unit.

In another example embodiment, the USB host 120 may include the first through (n)th USB host channels, first through (n)th host FIFO devices, and a multiplexer. The first through (n)th host FIFO devices may be connected to the first through (n)th USB host channels, respectively. For example, each of the first through (n)th host FIFO devices may be communicatively coupled to a respective one of the first through (n)th USB host channels, enabling the transmission of signals therethrough. Thus, the first through (n)th host FIFO devices may output the first through (n)th sub-data streams to the first through (n)th USB host channels, respectively. The multiplexer may alternately select the first through (n)th host FIFO devices based on a first channel selection signal to generate the first through (n)th sub-data streams. For example, the first through (n)th sub-data streams may be generated by splitting one data stream by the predetermined splitting unit to generate split data-pieces and by alternately storing the split data-pieces of the data stream in first through (n)th host FIFO devices. For example, the first through (n)th host FIFO devices may be implemented by memory devices. However, implementation of the first through (n)th host FIFO devices is not limited thereto.

The USB device 140 may receive the first through (n)th sub-data streams from the USB host 120 via the first through (n)th USB device channels, respectively, where the first through (n)th USB device channels of the USB device 140 are connected to the first through (n)th USB host channels of the USB host 120 via the first through (n)th cables 160(1) through 160(n), respectively, and the USB device 140 may restore one data stream by combining the first through (n)th sub-data streams. For this operation, in an example embodiment, the USB device 140 may include the first through (n)th USB device channels, first through (n)th device FIFO devices, a device counter, and a demultiplexer. The first through (n)th device FIFO devices may be connected to the first through (n)th USB device channels, respectively. Thus, the first through (n)th device FIFO devices may receive the first through (n)th sub-data streams from the first through (n)th USB device channels to store the first through (n)th sub-data streams, respectively. The device counter may count one data stream according to the predetermined splitting unit to output a second count signal while the data stream is restored. The demultiplexer may alternately select the first through (n)th device FIFO devices based on the second count signal to generate (i.e., restore) the data stream. For example, the data stream may be generated by alternately reading the first through (n)th sub-data streams from the first through (n)th device FIFO devices by the predetermined splitting unit and combining the read data-pieces of the first through (n)th sub-data streams. In another example embodiment, the USB device 140 may include the first through (n)th USB device channels, first through (n)th device FIFO devices, and a demultiplexer. The first through (n)th device FIFO devices may be connected to the first through (n)th USB device channels, respectively. Thus, the first through (n)th device FIFO devices may receive the first through (n)th sub-data streams from the first through (n)th USB device channels to store the first through (n)th sub-data streams, respectively. The demultiplexer may alternately select the first through (n)th device FIFO devices based on a second channel selection signal to generate (i.e., restore) the data stream. For example, the data stream may be generated by alternately reading the first through (n)th sub-data streams from the first through (n)th device FIFO devices by the predetermined splitting unit and combining the read data-pieces of the first through (n)th sub-data streams. For example, the first through (n)th device FIFO devices may be implemented by memory devices. However, implementation of the first through (n)th device FIFO devices is not limited thereto.

The first through (n)th cables 160(1) through 160(n) may be connected to the first through (n)th USB host channels of the USB host 120 via first through (n)th USB host ports, respectively, and may be connected to the first through (n)th USB device channels of the USB device 140 via first through (n)th USB device ports, respectively. The first through (n)th USB host ports may be the points of connection between the first through (n)th cables 160(1) through 160(n) and the first through (n)th USB host channels, respectively, and the first through (n)th USB device ports may be the points of connection between the first through (n)th cables 160(1) through 160(n) and the first through (n)th USB device channels, respectively. The first through (n)th USB host ports and the first through (n)th USB device ports may be, for example, locations where the first through (n)th cables 160(1) through 160(n) are physically connected to the corresponding first through (n)th USB host channels and first through (n)th USB device channels.

As explained in connection with FIG. 1, since the first through (n)th USB host channels are connected to the first through (n)th USB host ports in the USB host 120, the first through (n)th cables 160(1) through 160(n) may be connected to the first through (n)th USB host channels of the USB host 120 when the first through (n)th cables 160(1) through 160(n) are connected to the first through (n)th USB host ports of the USB host 120. In addition, since the first through (n)th USB device channels are connected to the first through (n)th USB device ports in the USB device 140, the first through (n)th cables 160(1) through 160(n) may be connected to the first through (n)th USB device channels of the USB device 140 when the first through (n)th cables 160(1) through 160(n) are connected to the first through (n)th USB device ports of the USB device 140. Thus, the first through (n)th cables 160(1) through 160(n) may connect the first through (n)th USB host channels of the USB host 120 to the first through (n)th USB device channels of the USB device 140, respectively. For example, the first USB channel may include the first USB host channel and the first USB device channel, where the first USB host channel is connected to the first USB device channel, the second USB channel may include the second USB host channel and the second USB device channel, where the second USB host channel is connected to the second USB device channel, and the (k)th USB channel may include the (k)th USB host channel and the (k)th USB device channel, where the (k)th USB host channel is connected to the (k)th USB device channel. As a result, the first sub-data stream may be transmitted from the USB host 120 to the USB device 140 via the first USB channel, the second sub-data stream may be transmitted from the USB host 120 to the USB device 140 via the second USB channel, and the (k)th sub-data stream may be transmitted from the USB host 120 to the USB device 140 via the (k)th USB channel.

In brief, the USB communication system 100 may increase a bandwidth for one data stream by dividing one data stream into the first through (n)th sub-data streams to be transmitted via the first through (n)th USB channels when the USB communication is performed between the USB host 120 and the USB device 140 via the first through (n)th USB channels. For example, the bandwidth of the USB communication system 100 may be increased by concurrent transmission of the first through (n)th sub-data streams between the USB host 120 and the USB device 140. To this end, the USB communication system 100 may control the USB host 120 to divide one data stream into the first through (n)th sub-data streams and to transmit the first through (n)th sub-data streams via the first through (n)th USB host channels, respectively, and may control the USB device 140 to receive the first through (n)th sub-data streams via the first through (n)th USB device channels, respectively, and may cause the USB device 140 to restore the data stream by combining the first through (n)th sub-data streams. Although it is described above that the USB host 120 divides one data stream into the first through (n)th sub-data streams and transmits the first through (n)th sub-data streams to the USB device 140 via the first through (n)th USB channels using on-the-fly technology (i.e., in real-time), in some example embodiments, the USB host 120 may divide one data stream into the first through (n)th sub-data streams, may completely store the first through (n)th sub-data streams in the first through (n)th host FIFO devices, and then may transmit the first through (n)th sub-data streams to the USB device 140 via the first through (n)th USB channels. In such embodiments, the USB host 120 may transmit the first through (n)th sub-data streams to the USB device 140 at any time (e.g., in a streaming manner).

Figure 2:
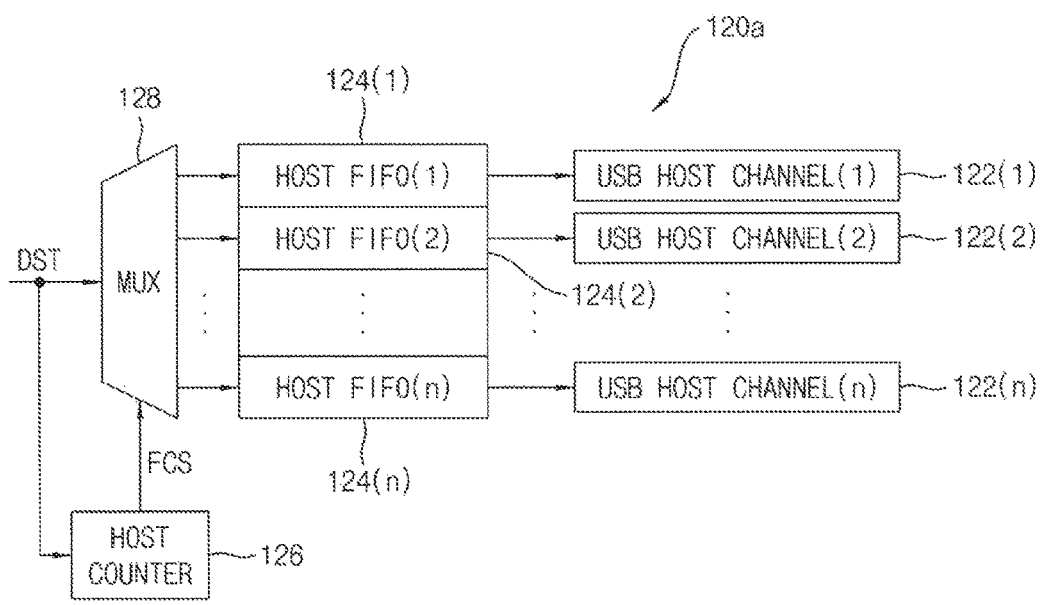
FIG. 2 is a diagram illustrating an example of a USB host included in the USB communication system of FIG. 1.
Figure 3:
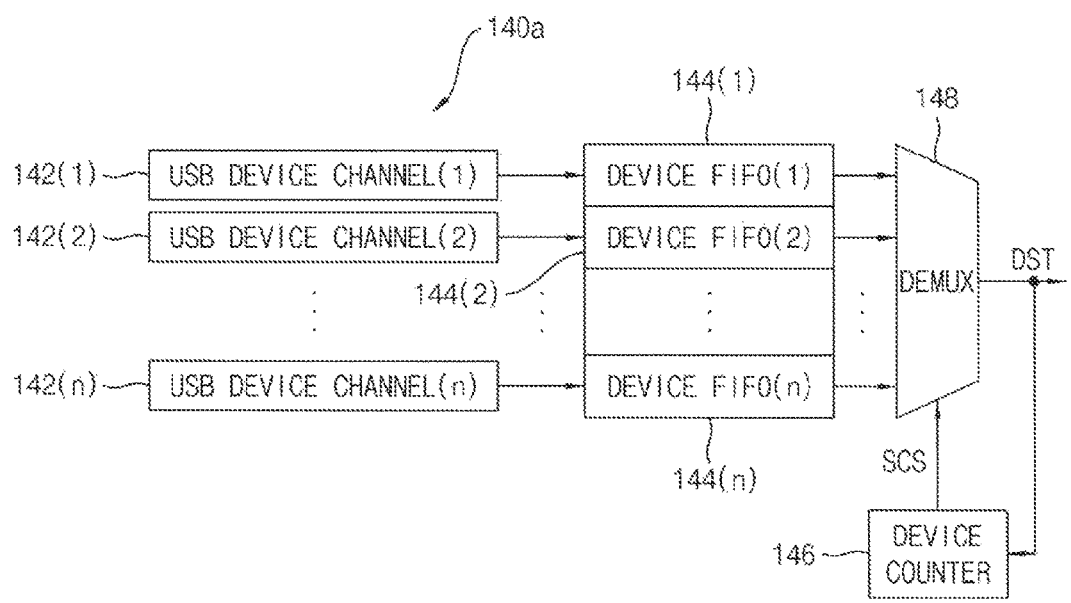
FIG. 3 is a diagram illustrating an example of a USB device included in the USB communication system of FIG. 1.
Figure 4:
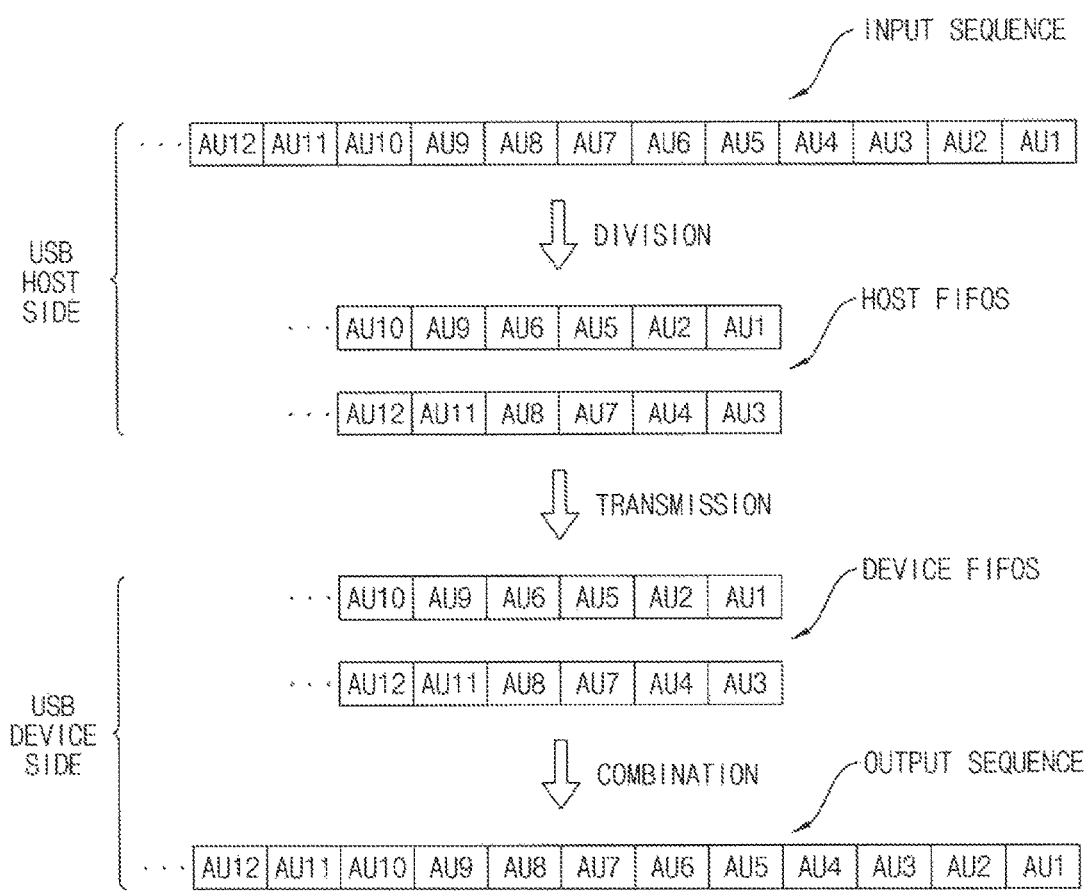
FIG. 4 is a diagram illustrating an example in which one data stream is transmitted from the USB host of FIG. 2 to the USB device of FIG. 3 in the USB communication system of FIG. 1.

FIG. 2 is a diagram illustrating an example of a USB host included in the USB communication system 100 of FIG. 1. FIG. 3 is a diagram illustrating an example of a USB device included in the USB communication system 100 of FIG. 1. FIG. 4 is a diagram illustrating an example in which one data stream is transmitted from the USB host of FIG. 2 to the USB device of FIG. 3 in the USB communication system 100 of FIG. 1.

Referring to FIG. 2, the USB host 120a may divide one data stream DST into the first through (n)th sub-data streams and may transmit the first through (n)th sub-data streams via the first through (n)th USB host channels 122(1) through 122(n), respectively. For this operation, the USB host 120a may include the first through (n)th USB host channels 122(1) through 122(n), the first through (n)th host FIFO devices 124(1) through 124(n), the host counter 126, and the multiplexer 128. The first through (n)th USB host channels 122(1) through 122(n) may be connected to the first through (n)th cables 160(1) through 160(n) via the first through (n)th USB host ports, respectively. In an example embodiment, each of the first through (n)th USB host channels 122(1) through 122(n) may include a USB link layer (i.e., USB LINK) and a USB physical layer (i.e., USB PHY). The USB link layer may receive the first through (n)th sub-data streams from the first through (n)th host FIFO devices 124(1) through 124(n) and then may transfer the first through (n)th sub-data streams to the USB physical layer. The USB physical layer may receive the first through (n)th sub-data streams from the USB link layer and then may transfer the first through (n)th sub-data streams to the first through (n)th cables 160(1) through 160(n). The first through (n)th host FIFO devices 124(1) through 124(n) may be connected to the first through (n)th USB host channels 122(1) through 122(n), respectively, may store the first through (n)th sub-data streams output from the multiplexer 128, respectively, and may output the first through (n)th sub-data streams to the first through (n)th USB host channels 122(1) through 122(n), respectively. The host counter 126 may count one data stream DST by the predetermined splitting unit to output the first count signal FCS while the data stream DST is input. The multiplexer 128 may alternately select the first through (n)th host FIFO devices 124(1) through 124(n) based on the first count signal FCS to generate the first through (n)th sub-data streams. For example, the first through (n)th sub-data streams may be generated by splitting one data stream DST by the predetermined splitting unit to generate split data-pieces and by alternately storing the split data-pieces of the data stream DST in the first through (n)th host FIFO devices 124(1) through 124(n) (i.e., indicated by DIVISION in FIG. 4).

For example, as illustrated in FIG. 4, when one data stream DST includes first through (m)th basic unit data AU1 through AUm, where m is an integer greater than or equal to 2, each of the first through (m)th basic unit data AU1 through AUm has a size corresponding to a word (e.g., 4 bytes, namely, 32 bits), the USB host 120a includes two host FIFO devices 124(1) and 124(2), and the predetermined splitting unit is 8 bytes (i.e., 64 bits), the first through (m)th basic unit data AU1 through AUm each having a size of 4 bytes may be sequentially input to the USB host 120a. Here, the host counter 126 may count the data stream DST by 8 bytes to output the first count signal FCS while the data stream DST is input. That is, the host counter 126 may count the first through (m)th basic unit data AU1 through AUm corresponding to the data stream DST by 2 to output the first count signal FCS. Thus, the multiplexer 128 may alternately select the first host FIFO device 124(1) and the second host FIFO device 124(2) to store the first through (m)th basic unit data AU1 through AUm in response to the first count signal FCS of which a logic level is changed every predetermined splitting unit (i.e., every 8 bytes). As a result, the third basic unit data AU3 and the fourth basic unit data AU4 may be stored in the second host FIFO device 124(2) after the first basic unit data AU1 and the second basic unit data AU2 are stored in the first host FIFO device 124(1), and the fifth basic unit data AU5 and the sixth basic unit data AU6 may be stored in the first host FIFO device 124(1) after the third basic unit data AU3 and the fourth basic unit data AU4 are stored in the second host FIFO device 124(2). In this way, the first through (m)th basic unit data AU1 through AUm may be alternately stored in the first host FIFO device 124(1) and the second host FIFO device 124(2) according to the predetermined splitting unit. Thus, the first sub-data stream, including basic unit data AU1, AU2, AU5, AU6, AU9, AU10, . . . , may be stored in the first host FIFO device 124(1), and the second sub-data stream, including basic unit data AU3, AU4, AU7, AU8, AU11, AU12, . . . , may be stored in the second host FIFO device 124(2).

Referring to FIG. 3, the USB device 140a may receive the first through (n)th sub-data streams via the first through (n)th USB device channels 142(1) through 142(n), respectively (i.e., indicated by TRANSMISSION) and may restore the data stream DST by combining the first through (n)th sub-data streams (i.e., indicated by COMBINATION). For this operation, the USB device 140a may include the first through (n)th USB device channels 142(1) through 142(n), the first through (n)th device FIFO devices 144(1) through 144(n), the device counter 146, and the demultiplexer 148. The first through (n)th USB device channels 142(1) through 142(n) may be connected to the first through (n)th cables 160(1) through 160(n) via the first through (n)th USB device ports, respectively. In an example embodiment, each of the first through (n)th USB device channels 142(1) through 142(n) may include a USB physical layer (i.e., USB PHY) and a USB link layer (i.e., USB LINK). The USB physical layer may receive the first through (n)th sub-data streams from the first through (n)th cables 160(1) through 160(n) and then may transfer the first through (n)th sub-data streams to the USB link layer. The USB link layer may receive the first through (n)th sub-data streams from the USB physical layer, and then may transfer the first through (n)th sub-data streams to the first through (n)th device FIFO devices 144(1) through 144(n). The first through (n)th device FIFO devices 144(1) through 144(n) may be connected to the first through (n)th USB device channels 142(1) through 142(n), respectively, may store the first through (n)th sub-data streams output from the first through (n)th USB device channels 142(1) through 142(n), respectively, and may output the first through (n)th sub-data streams to the demultiplexer 148, respectively. The device counter 146 may count one data stream DST by the predetermined splitting unit to output the second count signal SCS while the data stream DST is restored. The demultiplexer 148 may alternately select the first through (n)th device FIFO devices 144(1) through 144(n) based on the second count signal SCS to generate (i.e., restore) the data stream DST (i.e., indicated by COMBINATION). For example, the data stream DST may be generated by alternately reading the first through (n)th sub-data streams from the first through (n)th device FIFO devices 144(1) through 144(n) by the predetermined splitting unit and combining read data-pieces of the first through (n)th sub-data streams.

For example, as illustrated in FIG. 4, when one data stream DST includes the first through (m)th basic unit data AU1 through AUm, each of the first through (m)th basic unit data AU1 through AUm has a size corresponding to a word (e.g., 4 bytes), the USB device 140a includes two device FIFO devices 144(1) and 144(2), and the predetermined splitting unit is 8 bytes, the first sub-data stream AU1, AU2, AU5, AU6, AU9, AU10, . . . may be stored in the first device FIFO device 144(1) via the first USB device channel 142(1), and the second sub-data stream AU3, AU4, AU7, AU8, AU11, AU12, . . . may be stored in the second device FIFO device 144(2) via the second USB device channel 142(2). Here, the device counter 146 may count the data stream DST by 8 bytes to output the second count signal SCS while the data stream DST is restored. That is, the device counter 146 may count the first through (m)th basic unit data AU1 through AUm corresponding to both the first sub-data stream AU1, AU2, AU5, AU6, AU9, AU10, . . . and the second sub-data stream AU3, AU4, AU7, AU8, AU11, AU12, . . . by 2 to output the second count signal SCS. Thus, the demultiplexer 148 may alternately select the first device FIFO device 144(1) and the second device FIFO device 144(2) to read the first through (m)th basic unit data AU1 through AUm in response to the second count signal SCS of which a logic level is changed every the predetermined splitting unit (i.e., every 8 bytes). As a result, the third basic unit data AU3 and the fourth basic unit data AU4 may be output from the second device FIFO device 144(2) after the first basic unit data AU1 and the second basic unit data AU2 are output from the first device FIFO device 144(1), and the fifth basic unit data AU5 and the sixth basic unit data AU6 may be output from the first device FIFO device 144(1) after the third basic unit data AU3 and the fourth basic unit data AU4 are output from the second device FIFO device 144(2). In this way, the first through (m)th basic unit data AU1 through AUm may be alternately output from the first device FIFO device 144(1) and the second device FIFO device 144(2) by the predetermined splitting unit. Thus, the first sub-data stream AU1, AU2, AU5, AU6, AU9, AU10, . . . and the second sub-data stream AU3, AU4, AU7, AU8, AU11, AU12, . . . may be combined (i.e., indicated by COMBINATION), and the data stream DST (i.e., AU1, AU2, . . . , AUm) may be restored.

Figure 5:
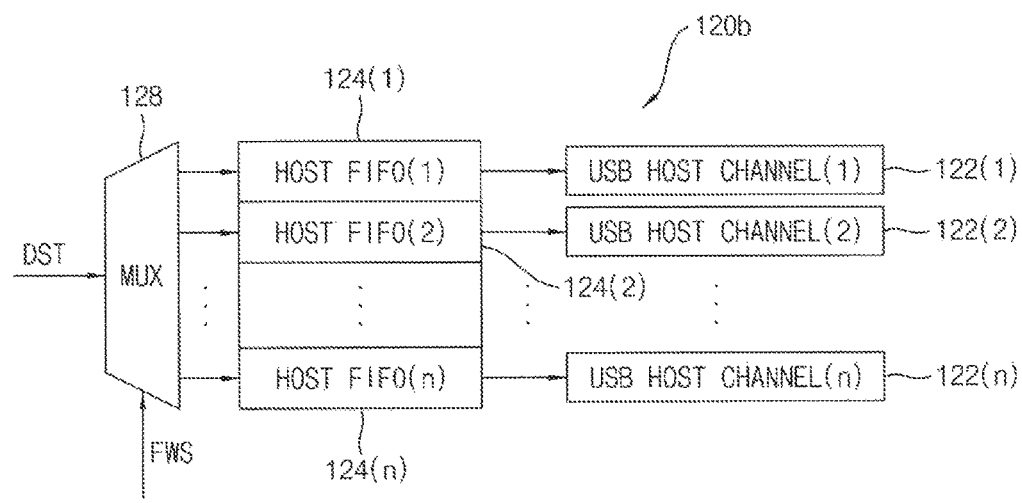
FIG. 5 is a diagram illustrating another example of a USB host included in the USB communication system of FIG. 1.
Figure 6:
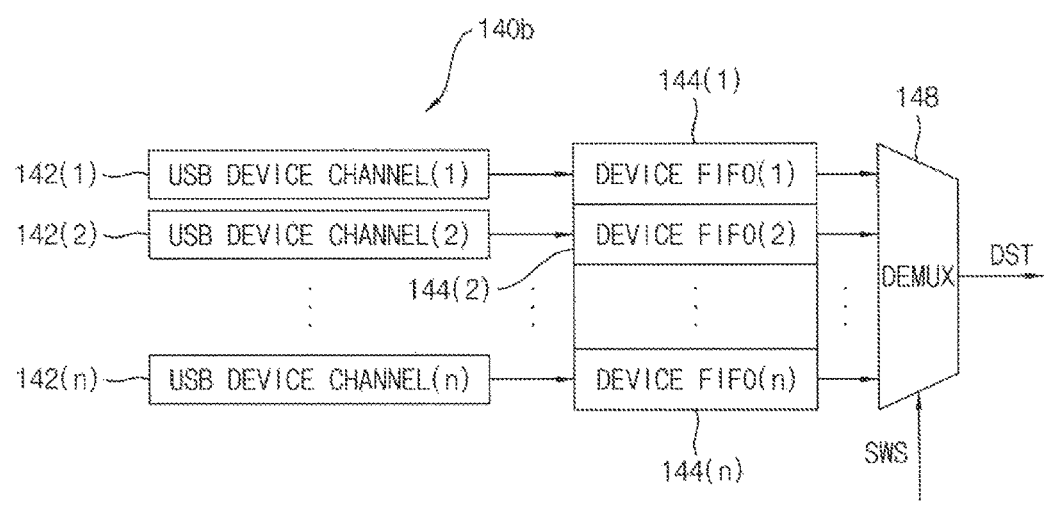
FIG. 6 is a diagram illustrating another example of a USB device included in the USB communication system of FIG. 1.
Figure 7:
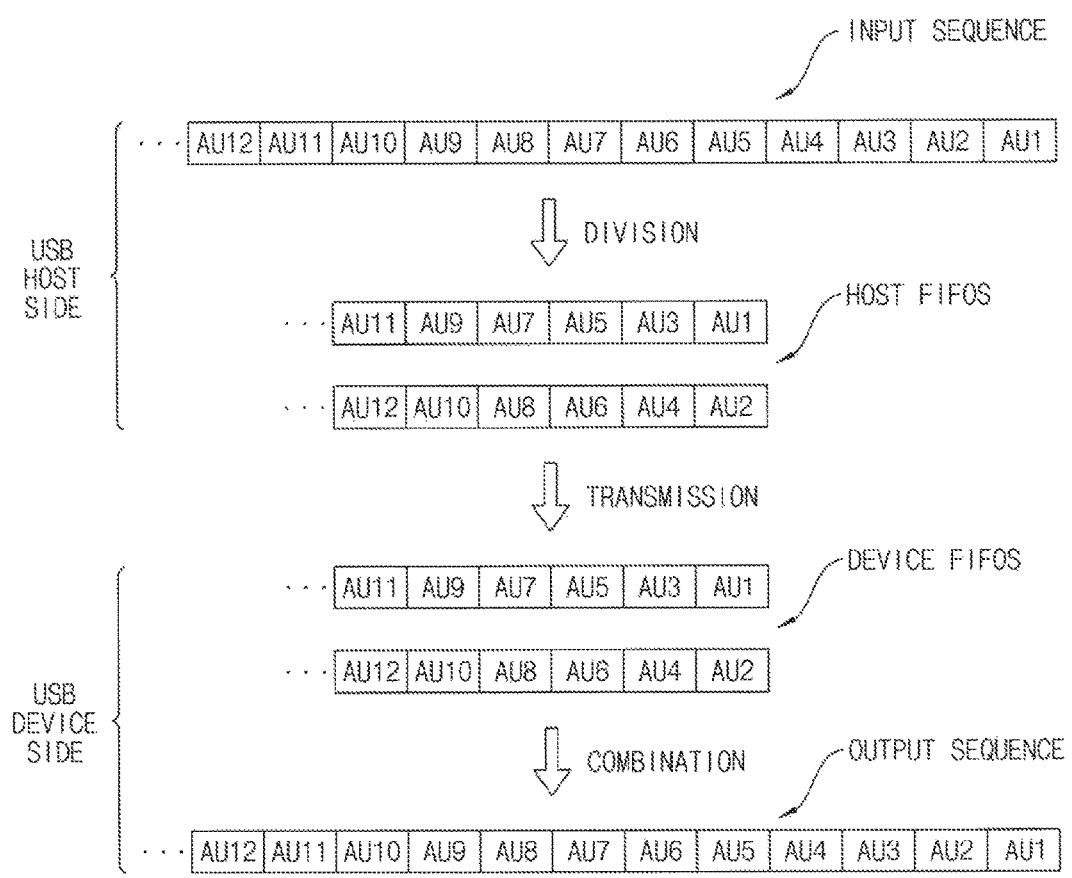
FIG. 7 is a diagram illustrating an example in which one data stream is transmitted from the USB host of FIG. 5 to the USB device of FIG. 6 in the USB communication system of FIG. 1.

FIG. 5 is a diagram illustrating another example of a USB host included in the USB communication system 100 of FIG. 1. FIG. 6 is a diagram illustrating another example of a USB device included in the USB communication system 100 of FIG. 1. FIG. 7 is a diagram illustrating an example in which one data stream is transmitted from the USB host of FIG. 5 to the USB device of FIG. 6 in the USB communication system 100 of FIG. 1.

Referring to FIG. 5, the USB host 120b may divide one data stream DST into the first through (n)th sub-data streams and may transmit the first through (n)th sub-data streams via the first through (n)th USB host channels 122(1) through 122(n), respectively. For this operation, the USB host 120b may include the first through (n)th USB host channels 122(1) through 122(n), the first through (n)th host FIFO devices 124(1) through 124(n), and the multiplexer 128. The first through (n)th USB host channels 122(1) through 122(n) may be connected to the first through (n)th cables 160(1) through 160(n) via the first through (n)th USB host ports, respectively. In an example embodiment, each of the first through (n)th USB host channels 122(1) through 122(n) may include a USB link layer (i.e., USB LINK) and a USB physical layer (i.e., USB PHY). The USB link layer may receive the first through (n)th sub-data streams from the first through (n)th host FIFO devices 124(1) through 124(n) and then may transfer the first through (n)th sub-data streams to the USB physical layer. The USB physical layer may receive the first through (n)th sub-data streams from the USB link layer and then may transfer the first through (n)th sub-data streams to the first through (n)th cables 160(1) through 160(n). The first through (n)th host FIFO devices 124(1) through 124(n) may be connected to the first through (n)th USB host channels 122(1) through 122(n), respectively, may store the first through (n)th sub-data streams output from the multiplexer 128, respectively, and may output the first through (n)th sub-data streams to the first through (n)th USB host channels 122(1) through 122(n), respectively. The multiplexer 128 may alternately select the first through (n)th host FIFO devices 124(1) through 124(n) based on the first channel selection signal FWS to generate the first through (n)th sub-data streams. For example, the first through (n)th sub-data streams may be generated by splitting one data stream DST by the predetermined splitting unit to generate split data-pieces and by alternately storing the split data-pieces of the data stream DST in the first through (n)th host FIFO devices 124(1) through 124(n) (i.e., indicated by DIVISION). Here, the first channel selection signal FWS may be a toggling signal that controls (e.g., alternates) an output of the multiplexer 128. In some example embodiments, the first channel selection signal FWS may be a bit that is input from an external component or a specific bit(s) of addresses indicating the basic unit data included in the data stream DST. For example, when addresses indicating four basic unit data included in the data stream DST are '00', '01', '10', and '11', the first channel selection signal FWS may be the first bit or the second bit of the addresses. Thus, when the first channel selection signal FWS is the first bit of the addresses, the first channel selection signal FWS for the basic unit data of which the addresses are '00' and '01' may be '0', and the first channel selection signal FWS for the basic unit data of which the addresses are '10' and '11' may be '1'. On the other hand, when the first channel selection signal FWS is the second bit of the addresses, the first channel selection signal FWS for the basic unit data of which the addresses are '00' and '10' may be '0', and the first channel selection signal FWS for the basic unit data of which the addresses are '01' and '11' may be '1'. These are non-limiting examples, and the first channel selection signal FWS may be set in various ways.

For example, as illustrated in FIG. 7, when one data stream DST includes first through (m)th basic unit data AU1 through AUm, each of the first through (m)th basic unit data AU1 through AUm has a size corresponding to a word (e.g., 4 bytes), the first channel selection signal FWS alternates between '0' and '1' for each of the first through (m)th basic unit data AU1 through AUm, and the USB host 120b includes two host FIFO devices 124(1) and 124(2), the first through (m)th basic unit data AU1 through AUm each having a size of 4 bytes may be sequentially input to the USB host 120b. Here, since the first channel selection signal FWS alternates between '0' and '1' for each of the first through (m)th basic unit data AU1 through AUm, the multiplexer 128 may alternately select the first host FIFO device 124(1) and the second host FIFO device 124(2) to store the first through (m)th basic unit data AU1 through AUm in response to the first channel selection signal FWS of which a logic level is changed every the predetermined splitting unit (i.e., every 4 bytes). As a result, the second basic unit data AU2 may be stored in the second host FIFO device 124(2) after the first basic unit data AU1 is stored in the first host FIFO device 124(1), the third basic unit data AU3 may be stored in the first host FIFO device 124(1) after the second basic unit data AU2 is stored in the second host FIFO device 124(2), and the fourth basic unit data AU4 may be stored in the second host FIFO device 124(2) after the third basic unit data AU3 is stored in the first host FIFO device 124(1). In this way, the first through (m)th basic unit data AU1 through AUm may be alternately stored in the first host FIFO device 124(1) and the second host FIFO device 124(2) by the predetermined splitting unit. Thus, the first sub-data stream, including basic unit data AU1, AU3, AU5, AU7, AU9, AU11, . . . , may be stored in the first host FIFO device 124(1), and the second sub-data stream, including basic unit data AU2, AU4, AU6, AU8, AU10, AU12, . . . , may be stored in the second host FIFO device 124(2).

Referring to FIG. 6, the USB device 140b may receive the first through (n)th sub-data streams via the first through (n)th USB device channels 142(1) through 142(n), respectively (i.e., indicated by TRANSMISSION) and may restore the data stream DST by combining the first through (n)th sub-data streams (i.e., indicated by COMBINATION). For this operation, the USB device 140b may include the first through (n)th USB device channels 142(1) through 142(n), the first through (n)th device FIFO devices 144(1) through 144(n), and the demultiplexer 148. The first through (n)th USB device channels 142(1) through 142(n) may be connected to the first through (n)th cables 160(1) through 160(n) via the first through (n)th USB device ports, respectively. In an example embodiment, each of the first through (n)th USB device channels 142(1) through 142(n) may include a USB physical layer (i.e., USB PHY) and a USB link layer (i.e., USB LINK). The USB physical layer may receive the first through (n)th sub-data streams from the first through (n)th cables 160(1) through 160(n) and then may transfer the first through (n)th sub-data streams to the USB link layer. The USB link layer may receive the first through (n)th sub-data streams from the USB physical layer and then may transfer the first through (n)th sub-data streams to the first through (n)th device FIFO devices 144(1) through 144(n). The first through (n)th device FIFO devices 144(1) through 144(n) may be connected to the first through (n)th USB device channels 142(1) through 142(n), respectively, may store the first through (n)th sub-data streams output from the first through (n)th USB device channels 142(1) through 142(n), respectively, and may output the first through (n)th sub-data streams to the demultiplexer 148, respectively. The demultiplexer 148 may alternately select the first through (n)th device FIFO devices 144(1) through 144(n) based on the second channel selection signal SWS to generate (i.e., restore) the data stream DST (i.e., indicated by COMBINATION). For example, the data stream DST may be generated by alternately reading the first through (n)th sub-data streams from the first through (n)th device FIFO devices 144(1) through 144(n) by the predetermined splitting unit and by combining read data-pieces of the first through (n)th sub-data streams. Here, the second channel selection signal SWS may be a toggling signal that controls (e.g., alternates) an output of the demultiplexer 148. In some example embodiments, the second channel selection signal SWS may be a bit that is input from an external component or a specific bit(s) of addresses indicating the basic unit data included in the data stream DST.

For example, as illustrated in FIG. 7, when one data stream DST includes the first through (m)th basic unit data AU1 through AUm, each of the first through (m)th basic unit data AU1 through AUm has a size corresponding to a word (e.g., 4 bytes), the second channel selection signal SWS alternates between '0' and '1' for each of the first through (m)th basic unit data AU1 through AUm, and the USB device 140b includes two device FIFO devices 144(1) and 144(2), the first sub-data stream AU1, AU3, AU5, AU7, AU9, AU11, . . . may be stored in the first device FIFO device 144(1) via the first USB device channel 142(1), and the second sub-data stream AU2, AU4, AU6, AU8, AU10, AU12, . . . may be stored in the second device FIFO device 144(2) via the second USB device channel 142(2). Here, since the second channel selection signal SWS alternates between '0' and '1' for each of the first through (m)th basic unit data AU1 through AUm, the demultiplexer 148 may alternately select the first device FIFO device 144(1) and the second device FIFO device 144(2) to read the first through (m)th basic unit data AU1 through AUm in response to the second channel selection signal SWS of which a logic level is changed every the predetermined splitting unit (i.e., every 4 bytes). As a result, the second basic unit data AU2 may be output from the second device FIFO device 144(2) after the first basic unit data AU1 is output from the first device FIFO device 144(1), the third basic unit data AU3 may be output from the first device FIFO device 144(1) after the second basic unit data AU2 is output from the second device FIFO device 144(2), and the fourth basic unit data AU4 may be output from the second device FIFO device 144(2) after the third basic unit data AU3 is output from the first device FIFO device 144(1). In this way, the first through (m)th basic unit data AU1 through AUm may be alternately output from the first device FIFO device 144(1) and the second device FIFO device 144(2) by the predetermined splitting unit. Thus, the first sub-data stream AU1, AU3, AU5, AU7, AU9, AU11, . . . and the second sub-data stream AU2, AU4, AU6, AU8, AU10, AU12, . . . may be combined (i.e., indicated by COMBINATION), and the data stream DST (i.e., AU1, AU2, . . . , AUm) may be restored.

Figure 8:
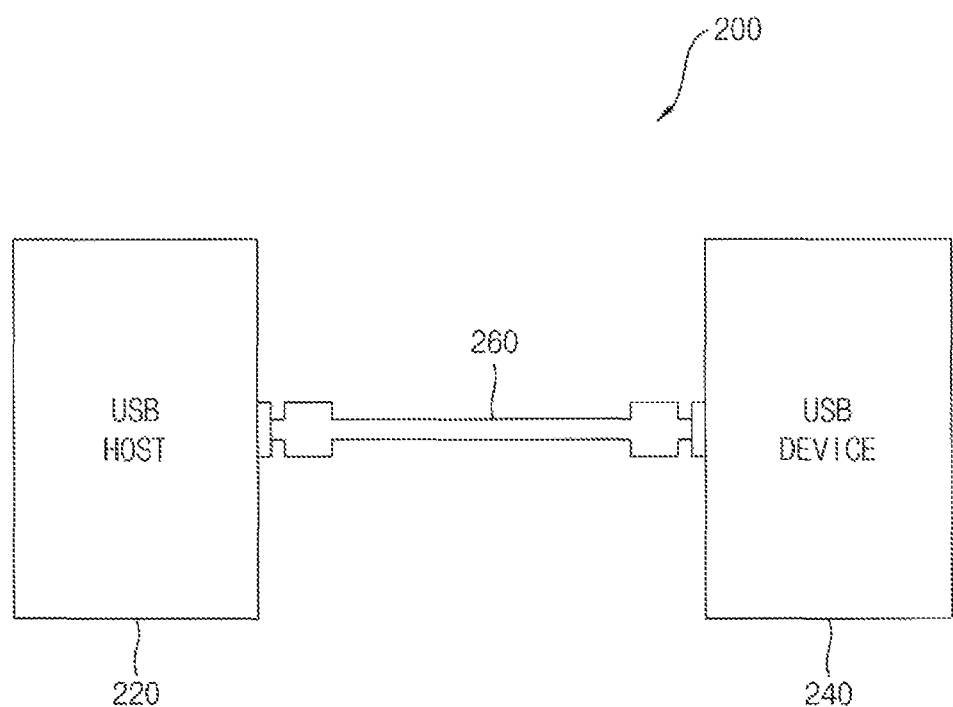
FIG. 8 is a diagram illustrating a USB communication system according to example embodiments.

FIG. 8 is a diagram illustrating a USB communication system according to example embodiments.

Referring to FIG. 8, the USB communication system 200 may include a USB host 220, a USB device 240, and a single cable 260. Here, the USB host 220 may transmit one data stream to the USB device 240 via first through (n)th USB channels. Here, a (k)th USB channel of the first through (n)th USB channels indicates a channel including a (k)th USB host channel of first through (n)th USB host channels in the USB host 220 and a (k)th USB device channel of first through (n)th USB device channels in the USB device 240. Specifically, the USB host 220 may divide one data stream into first through (n)th sub-data streams, and then may transmit the first through (n)th sub-data streams to the USB device 240 via the first through (n)th USB host channels, respectively, where the first through (n)th USB host channels of the USB host 220 are connected to the first through (n)th USB device channels of the USB device 240 via the single cable 260, respectively. For this operation, in an example embodiment, the USB host 220 may include the first through (n)th USB host channels, first through (n)th host FIFO devices, a host counter, and a multiplexer. In another example embodiment, the USB host 220 may include the first through (n)th USB host channels, first through (n)th host FIFO devices, and a multiplexer. Since a structure and an operation of the USB host 220 are described with reference to FIGS. 1 through 7 (e.g., USB host 120), duplicated description related thereto will not be repeated. The USB device 240 may receive the first through (n)th sub-data streams from the USB host 220 via the first through (n)th USB device channels, respectively, where the first through (n)th USB device channels of the USB device 240 are connected to the first through (n)th USB host channels of the USB host 220 via the single cable 260, respectively, and may restore one data stream by combining the first through (n)th sub-data streams. For this operation, in an example embodiment, the USB device 240 may include the first through (n)th USB device channels, first through (n)th device FIFO devices, a device counter, and a demultiplexer. In another example embodiment, the USB device 240 may include the first through (n)th USB device channels, first through (n)th device FIFO devices, and a demultiplexer. Since a structure and an operation of the USB device 240 are described with reference to FIGS. 1 through 7 (e.g., USB device 140), duplicated description related thereto will not be repeated. For example, the first through (n)th host FIFO devices and the first through (n)th device FIFO devices may be implemented by memory devices. However, implementation of the first through (n)th host FIFO devices and implementation of the first through (n)th device FIFO devices are not limited thereto.

The single cable 260 may be connected to the first through (n)th USB host channels of the USB host 220 via a single USB host port and may be connected to the first through (n)th USB device channels of the USB device 240 via a single USB device port. In an example embodiment, the single cable 260 may be a USB C-type cable. As illustrated in FIG. 8, since the first through (n)th USB host channels are connected to the single USB host port in the USB host 220, the single cable 260 may be connected to the first through (n)th USB host channels of the USB host 220 when the single cable 260 is connected to the single USB host port of the USB host 220. For example, the single cable 260 may include first through (n)th transmission lines, and the first through (n)th USB host channels of the USB host 220 may be connected to the first through (n)th transmission lines of the single cable 260, respectively. In addition, since the first through (n)th USB device channels are connected to the single USB device port in the USB device 240, the single cable 260 may be connected to the first through (n)th USB device channels of the USB device 240 when the single cable 260 is connected to the single USB device port of the USB device 240. For example, the single cable 260 may include the first through (n)th transmission lines, and the first through (n)th USB device channels of the USB device 240 may be connected to the first through (n)th transmission lines of the single cable 260, respectively. Thus, the single cable 260 may connect the first through (n)th USB host channels of the USB host 220 to the first through (n)th USB device channels of the USB device 240, respectively. For example, the first USB channel may include the first USB host channel and the first USB device channel, where the first USB host channel is connected to the first USB device channel, the second USB channel may include the second USB host channel and the second USB device channel, where the second USB host channel is connected to the second USB device channel, and the (k)th USB channel may include the (k)th USB host channel and the (k)th USB device channel, where the (k)th USB host channel is connected to the (k)th USB device channel. As a result, the first sub-data stream may be transmitted from the USB host 220 to the USB device 240 via the first USB channel, the second sub-data stream may be transmitted from the USB host 220 to the USB device 240 via the second USB channel, and the (k)th sub-data stream may be transmitted from the USB host 220 to the USB device 240 via the (k)th USB channel.

In brief, the USB communication system 200 may increase a bandwidth for one data stream by dividing one data stream into the first through (n)th sub-data streams to be transmitted via the first through (n)th USB channels when the USB communication is performed between the USB host 220 and the USB device 240 via the first through (n)th USB channels. To this end, the USB communication system 200 may control the USB host 220 to divide one data stream into the first through (n)th sub-data streams and to transmit the first through (n)th sub-data streams via the first through (n)th USB host channels, respectively and may control the USB device 240 to receive the first through (n)th sub-data streams via the first through (n)th USB device channels, respectively and to restore the data stream by combining the first through (n)th sub-data streams. Although it is described above that the USB host 220 divides one data stream into the first through (n)th sub-data streams and transmits the first through (n)th sub-data streams to the USB device 240 via the first through (n)th USB channels using on-the-fly technology, in some example embodiments, the USB host 220 may divide one data stream into the first through (n)th sub-data streams, may completely store the first through (n)th sub-data streams in the first through (n)th host FIFO devices, and then may transmit the first through (n)th sub-data streams to the USB device 240 via the first through (n)th USB channels.

Figure 9:
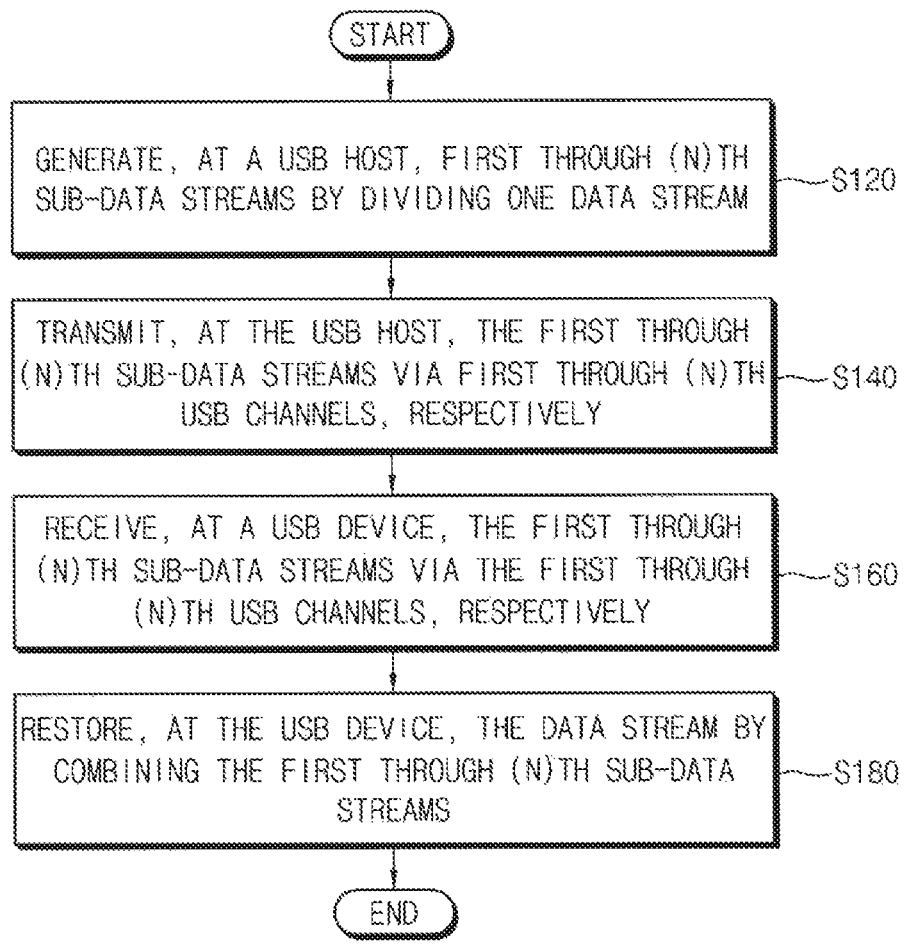
FIG. 9 is a flowchart illustrating a method of performing a USB communication according to example embodiments.
Figure 10:
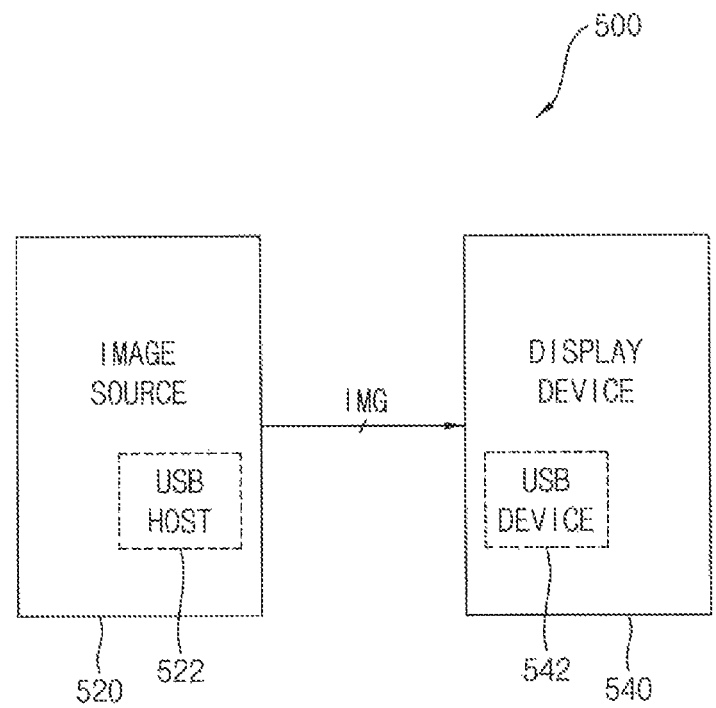
FIG. 10 is a diagram illustrating a display system employing the method of FIG. 9.

FIG. 9 is a flowchart illustrating a method of performing a USB communication according to example embodiments. FIG. 10 is a diagram illustrating a display system employing the method of FIG. 9.

Referring to FIGS. 9 and 10, the method of FIG. 9 may control a USB host 522 to generate first through (n)th sub-data streams by dividing one data stream (S120), may control the USB host 522 to transmit the first through (n)th sub-data streams via first through (n)th USB channels, respectively (S140), may control a USB device 542 to receive the first through (n)th sub-data streams via the first through (n)th USB channels, respectively (S160), and may control the USB device 542 to restore the data stream by combining the first through (n)th sub-data streams (S180). As described above, the USB communication may be performed between the USB host 522 and the USB device 542 via the first through (n)th USB channels. Here, a (k)th USB channel of the first through (n)th USB channels indicates a channel including a (k)th USB host channel of the first through (n)th USB host channels in the USB host 522 and a (k)th USB device channel of the first through (n)th USB device channels in the USB device 542.

Specifically, the method of FIG. 9 may control the USB host 522 to generate the first through (n)th sub-data streams by dividing one data stream (S120). Here, the method of FIG. 9 may generate spilt data-pieces of the data stream by sequentially splitting the data stream according to a predetermined splitting unit and may alternately allocate the split data-pieces of the data stream to the first through (n)th USB channels. In an example embodiment, the method of FIG. 9 may use a counter to generate the split data-pieces of the data stream by sequentially splitting the data stream by the predetermined splitting unit. In another example embodiment, the method of FIG. 9 may use a toggling signal to generate the split data-pieces of the data stream by sequentially splitting the data stream by the predetermined splitting unit. In example embodiments, the method of FIG. 9 may use a multiplexer to alternately allocate the split data-pieces of the data stream to the first through (n)th USB channels. Next, the method of FIG. 9 may control the USB host 522 to transmit the first through (n)th sub-data streams via the first through (n)th USB channels, respectively (S140). In an example embodiment, the first through (n)th USB channels may be formed in first through (n)th cables, respectively. In another example embodiment, the first through (n)th USB channels may be formed in first through (n)th transmission lines of a single cable, respectively. For example, the single cable may be a USB C-type cable. However, the single cable is not limited thereto. Subsequently, the method of FIG. 9 may control the USB device 542 to receive the first through (n)th sub-data streams via the first through (n)th USB channels, respectively (S160) and may control the USB device 542 to restore the data stream by combining the first through (n)th sub-data streams (S180). Here, the method of FIG. 9 may alternately read split data-pieces of the data stream from the first through (n)th sub-data streams and may generate the data stream by sequentially combining read data-pieces of the first through (n)th sub-data streams. In an example embodiment, the method of FIG. 9 may use a counter to alternately read the split data-pieces of the data stream from the first through (n)th sub-data streams. In another example embodiment, the method of FIG. 9 may use a toggling signal to alternately read the split data-pieces of the data stream from the first through (n)th sub-data streams.

As illustrated in FIG. 10, the display system 500 may employ the method of FIG. 9. In this case, an image source 520 may include the USB host 522, and a display device 540 may include the USB device 542. In some example embodiments, the display device 540 may be an organic light emitting display (OLED) device, a liquid crystal display (LCD) device, etc. Generally, as a resolution of a display panel included in the display device 540 increases, a size of image data IMG transmitted from the image source 520 to the display device 540 may increase. However, since a bandwidth for the USB communication between the USB host 522 of the image source 520 and the USB device 542 of the display device 540 has limits, the USB host 522 of the image source 520 may be connected to the USB device 542 of the display device 540 using the first though (n)th cables or the single cable (e.g., the USB C-type cable) including the first through (n)th transmission lines in order to properly transmit the image data IMG. Here, the method of FIG. 9 may increase a bandwidth for one data stream by dividing the data stream into the first through (n)th sub-data streams to be transmitted via the first through (n)th USB channels, respectively, where the first through (n)th USB channels correspond to the first through (n)th cables or the first through (n)th transmission lines of the single cable. For example, assuming that a bandwidth of one USB channel is 300 MB/s, two USB channels may be used (i.e., a total bandwidth may become 600 MB/s) to transmit one data stream that requires a bandwidth of 566 MB/s. Similarly, assuming that a bandwidth of one USB channel is 600 MB/s, two USB channels may be used (i.e., a total bandwidth may become 1.2 GB/s) to transmit one data stream that requires a bandwidth of 1 GB/s. In some example embodiments, the display system 500 may include a processor, a memory device, a storage device, an input/output (I/O) device, a power supply, etc. The processor may perform various computing functions for the display system 500. The processor may be a micro processor, a central processing unit (CPU), an application processor (AP), etc. The memory device may store data for operations of the display system 500. For example, the memory device may include at least one non-volatile memory device and/or at least one volatile memory device. The storage device may include a solid state drive (SSD) device, a hard disk drive (HDD) device, a CD-ROM device, etc. The I/O device may include an input device such as a keyboard, a keypad, a mouse device, a touchpad, a touch-screen, etc, and an output device such as a printer, a speaker, the display device 540, etc. The power supply may provide power for the operations of the display system 500.

The concepts may be applied to a USB communication system and an electronic device including the USB communication system. For example, the concepts may be applied to a cellular phone, a smart phone, a video phone, a smart pad, a smart watch, a tablet PC, a car navigation system, a television, a computer monitor, a laptop, a head mounted display (HMD) device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present concepts. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A universal serial bus (USB) communication system, comprising:
   a USB host configured to divide a data stream into first through (n)th sub-data streams, where n is an integer greater than or equal to 2, and to transmit the first through (n)th sub-data streams via first through (n)th USB host channels, respectively;
   a USB device configured to receive the first through (n)th sub-data streams via first through (n)th USB device channels, respectively, and to restore the data stream by combining the first through (n)th sub-data streams; and
   first through (n)th cables connected to the first through (n)th USB host channels via first through (n)th USB host ports, respectively, connected to the first through (n)th USB device channels via first through (n)th USB device ports, respectively, and configured to connect the first through (n)th USB host channels to the first through (n)th USB device channels, respectively,
   wherein the USB host includes:
   the first through (n)th USB host channels;
   first through (n)th host first-in first-out (FIFO) devices connected to the first through (n)th USB host channels, respectively, and configured to output the first through (n)th sub-data streams to the first through (n)th USB host channels, respectively;
   a host counter configured to count the data stream according to a predetermined splitting unit to output a first count signal while the data stream is input; and
   a multiplexer configured to alternately select the first through (n)th host FIFO devices based on the first count signal to generate the first through (n)th sub-data streams, the first through (Oh sub-data streams being generated by splitting the data stream by the predetermined splitting unit to generate split data-pieces and alternately storing the split data-pieces of the data stream in the first through (n)th host FIFO devices.

2. The system of claim 1, wherein the USB device includes:
   the first through (n)th USB device channels;
   first through (n)th device FIFO devices connected to the first through (n)th USB device channels, respectively, and configured to receive and store the first through (n)th sub-data streams received from the first through (n)th USB device channels, respectively;
   a device counter configured to count the data stream according to the predetermined splitting unit to output a second count signal while the data stream is restored; and
   a demultiplexer configured to alternately select the first through (n)th device FIFO devices based on the second count signal to restore the data stream, the data stream being restored by alternately reading the first through (n)th sub-data streams from the first through (n)th device FIFO devices by the predetermined splitting unit and combining read data-pieces of the first through (n)th sub-data streams.

3. The system of claim 2, wherein the first through (n)th host FIFO devices and the first through (n)th device FIFO devices are implemented by memory devices.

4. A universal serial bus (USB) communication system, comprising:
   a USB host configured to divide a data stream into first through (n)th sub-data streams, where n is an integer greater than or equal to 2, and to transmit the first through (n)th sub-data streams via first through (n)th USB host channels, respectively;
   a USB device configured to receive the first through (n)th sub-data streams via first through (n)th USB device channel, respectively, and to restore the data stream by combining the first through (n)th sub-data streams; and
   first through (n)th cables connected to the first through (n)th USB host channels via first through (n)th USB host ports, respectively, connected to the first through (n)th USB device channels via first through (n)th USB device ports, respectively, and configured to connect the first through (n)th USB host channels to the first through (n)th USB device channels, respectively,
   wherein the USB host includes:
   the first through (n)th USB host channels;
   first through (n)th host first-in first-out (FIFO) devices connected to the first through (n)th USB host channels, respectively, and configured to output the first through (n)th sub-data streams to the first through (n)th USB host channels, respectively; and
   a multiplexer configured to alternately select the first through (n)th host FIFO devices based on a first channel selection signal to generate the first through (n)th sub-data streams, the first through (n)th sub-data streams being generated by splitting the data stream by a predetermined splitting unit to generate split data-pieces and alternately storing the split data-pieces of the data stream in the first through (n)th host FIFO devices.

5. The system of claim 4, wherein the USB device includes:
the first through (n)th USB device channels;
first through (n)th device FIFO devices connected to the first through (n)th USB device channels, respectively, and configured to receive and store the first through (n)th sub-data streams received from the first through (n)th USB device channels, respectively; and
a demultiplexer configured to alternately select the first through (n)th device FIFO devices based on a second channel selection signal to restore the data stream, the data stream being restored by alternately reading the first through (n)th sub-data streams from the first through (n)th device FIFO devices by the predetermined splitting unit and combining read data-pieces of the first through (n)th sub-data streams.

6. The system of claim 5, wherein the first through (n)th host FIFO devices and the first through (n)th device FIFO devices are implemented by memory devices.

7. A universal serial bus (USB) communication system, comprising:
a USB host configured to divide a data stream into first through (n)th sub-data streams, where n is an integer greater than or equal to 2, and to transmit the first through (n)th sub-data streams via first through (n)th USB host channels, respectively;
a USB device configured to receive the first through (n)th sub-data streams via first through (n)th USB device channels, respectively, and to restore the data stream by combining the first through (n)th sub-data streams; and
a single cable connected to the first through (n)th USB host channels via a single USB host port and connected to the first through (n)th USB device channels via a single USB device port, and configured to connect the first through (n)th USB host channels to the first through (n)th USB device channels, respectively,
wherein the USB host includes:
the first through (n)th USB host channels;
first, through (n)th host first-in first-out (FIFO) devices connected to the first through (n)th USB host channels, respectively, and configured to output the first through (n)th sub-data streams to the first through (n)th USB host channels, respectively;
a host counter configured to count the data stream according to a predetermined splitting unit to output a first count signal while the data stream is input; and
a multiplexer configured to alternately select the first through (n)th host FIFO devices based on the first count signal to generate the first through (n)th sub-data streams, the first through (n) sub-data streams being generated by splitting the data stream by predetermined splitting unit to generate split data-pieces and alternately storing the split data-pieces of the data stream in the first through (n)th host FIFO devises.

8. The system of claim 7, wherein the single cable is a USB C-type cable.

9. The system of claim 7, wherein the USB device includes:
the first through (n)th USB device channels;
first through (n)th device FIFO devices connected to the first through (n)th USB device channels, respectively, and configured to receive and store the first through (n)th sub-data streams received from the first through (n)th USB device channels, respectively;

a device counter configured to count the data stream according to the predetermined splitting unit to output a second count signal while the data stream is restored; and
a demultiplexer configured to alternately select the first through (n)th device FIFO devices based on the second count signal to restore the data stream, the data stream being restored by alternately reading the first through (n)th sub-data streams from the first through (n)th device FIFO devices by the predetermined splitting unit and by combining read data-pieces of the first through (n)th sub-data streams.

10. The system of claim 9, wherein the first through (n)th host FIFO devices and the first through (n)th device FIFO devices are implemented by memory devices.

11. A universal serial bus (USB) communication system, comprising:
a USB host configured to divide a data stream into first through (n)th sub-data streams, where n is an integer greater than or equal to 2, and to transmit the first through (n)th sub-data streams via first through (n)th USB host channels, respectively;
USB device configured to receive the first through (n)th sub-data streams via first through (n)th USB device channels, respectively, and to restore the data stream by combining the first through (n)th sub-data streams; and
a single cable connected to the first through (n)th USB host channels via a single USB host port and connected to the first through In)th USB device channels via a single USB device port, and configured to connect the first through (n)th USB host channels to the first through (n)th USB device channels, respectively,
wherein the USB host includes:
the first through (n)th USB host channels;
first through (n)th host first-in first-out (FIFO) devices connected to the first through (n)th USB host channels, respectively, and configured to output the first through (n)th sub-data streams to the first through (n)th USB host channels, respectively; and
a multiplexer configured to alternately select the first through (n)th host FIFO devices based on a first channel selection signal to generate the first through (n)th sub-data streams, the first through (n)th sub-data streams being generated by splitting the data stream by a predetermined splitting unit to generate split data-pieces and alternately storing the split data-pieces of the data stream in the first through (n)th host FIFO devices.

12. The system of claim 11, wherein the USB device includes:
the first through (n)th USB device channels;
first through (n)th device FIFO devices connected to the first through (n)th USB device channels, respectively and configured to receive and store the first through (n)th sub-data streams received from the first through (n)th USB device channels, respectively; and
a demultiplexer configured to alternately select the first through (n)th device FIFO devices based on a second channel selection signal to restore the data stream, the data stream being restored by alternately reading the first through (n)th sub-data streams from the first through (n)th device FIFO devices by the predetermined splitting unit and combining read data-pieces of the first through (n)th sub-data streams.

13. The system of claim 12, wherein the first through (n)th host FIFO devices and the first through (n)th device FIFO devices are implemented by memory devices.

14. A universal serial bus (USB) communication system, comprising:
- a USB host configured to divide a data stream into first through (n)th sub-data streams, where n is an integer greater than or equal to 2, and to transmit the first through (n)th sub-data streams via first through (n)th USB host channels, respectively;
- a USB device configured to receive the first through (n)th sub-data streams via first through (n)th USB device channels, respectively, and to restore the data stream by combining the first through (n)th sub-data streams; and
- a cable connected to the first through (n)th USB host channels and connected to the first through (n)th USB device channels, and configured to connect the first through (n)th USB host channels to the first through (n)th USB device channels, respectively,
- wherein the USB host includes the first through (n)th USB host channels and the USB device includes the first through (n)th USB device channels,
- wherein the USB host includes:
  - the first through (n)th USB host channels;
  - first through (n)th host first-in first-out (FIFO) devices connected to the first through (n)th USB host channels, respectively, and configured to output the first through (Oh sub data streams to the first through (n)th USB host channels, respectively;
  - a host counter configured to count the data stream according to a predetermined splitting unit to output a first count signal while the data stream is input; and
  - a multiplexer configured to alternately select the first through (n)th host FIFO devices based on the first count signal to generate the first through n)th sub-data streams, the first through (n)th sub-data streams being generated by splitting the data stream by the predetermined stream in the first through (n)th host FIFO devices.

15. The system of claim 14, wherein the USB device includes:
- the first through (n)th USB device channels;
- first through (n)th device FIFO devices connected to the first through (n)th USB device channels, respectively, and configured to receive and store the first through (n)th sub-data streams received from the first through (n)th USB device channels, respectively;
- a device counter configured to count the data stream according to the predetermined splitting unit to output a second count signal while the data stream is restored; and
- a demultiplexer configured to alternately select the first through (n)th device FIFO devices based on the second count signal to restore the data stream, the data stream being restored by alternately reading the first through (n)th sub-data streams from the first through (n)th device FIFO devices by the predetermined splitting unit and by combining read data-pieces of the first through (n)th sub-data streams.

16. A universal serial bus (USB) communication system, comprising:
- a USB host configured to divide a data stream into first through (n)th sub-data streams, where n is an integer greater than or equal to 2, and to transmit the first through (n)th sub-data streams via first through (n)th USB host channels, respectively;
- a USB device configured to receive the first through (n)th sub-data, streams via first through (n)th USB device channels, respectively, and to restore the data stream by combining the first through (n)th sub-data streams; and
- a cable connected to the first through (n)th USB host channels and connected to the first through (n)th USB device channels, and configured to connect the first through (n)th USB host channels to the first through (n)th USB device channels, respectively,
- wherein the USB host includes:
  - the first through (n)th USB host channels;
  - first through (n)th host first-in first-out (FIFO) devices connected to the first through (n)th USB host channels, respectively, and configured to output the first through (n)th sub-data streams to the first through (n)th USB host channels, respectively; and
  - a multiplexer configured to alternately select the first through (n)th host FIFO devices based on a first channel selection signal to generate the first through (n)th sub-data streams, the first through (n)th sub-data streams being generated by splitting the data stream by a predetermined splitting unit to generate split data-pieces and alternately storing the split data-pieces of the data stream in the first through (n)th host FIFO devices.

17. The system of claim 16, wherein the USB device includes:
- the first through (n)th USB device channels;
- first through (n)th device FIFO devices connected to the first through (n)th USB device channels, respectively and configured to receive and store the first through (n)th sub-data streams received from the first through (n)th USB device channels, respectively; and
- a demultiplexer configured to alternately select the first through (n)th device FIFO devices based on a second channel selection signal to restore the data stream, the data stream being restored by alternately reading the first through (n)th sub-data streams from the first through (n)th device FIFO devices by the predetermined splitting unit and combining read data-pieces of the first through (n)th sub-data streams.

\* \* \* \* \*